(12) United States Patent
Su et al.

(10) Patent No.: US 10,760,990 B2
(45) Date of Patent: Sep. 1, 2020

(54) WATER ENGINEERING SEEPAGE BEHAVIOR FUSING AND SENSING SYSTEM AND METHOD

(71) Applicant: HOHAI UNIVERSITY, Jiangsu (CN)

(72) Inventors: Huaizhi Su, Jiangsu (CN); Meng Yang, Jiangsu (CN); Chongshi Gu, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 163 days.

(21) Appl. No.: 16/098,868

(22) PCT Filed: Oct. 25, 2016

(86) PCT No.: PCT/CN2016/103222
§ 371 (c)(1),
(2) Date: Nov. 5, 2018

(87) PCT Pub. No.: WO2017/190476
PCT Pub. Date: Nov. 9, 2017

(65) Prior Publication Data
US 2019/0195720 A1   Jun. 27, 2019

(30) Foreign Application Priority Data

May 5, 2016   (CN) ........................... 2016 1 0294922

(51) Int. Cl.
*G01M 3/04*   (2006.01)
*G01P 5/26*   (2006.01)
(Continued)

(52) U.S. Cl.
CPC .............. *G01M 3/047* (2013.01); *G01M 3/38* (2013.01); *G01P 5/26* (2013.01); *G01M 3/165* (2013.01)

(58) Field of Classification Search
CPC ............ G01M 3/047; G01M 3/38; G01P 5/26
See application file for complete search history.

(56) References Cited

U.S. PATENT DOCUMENTS

| 6,526,807 B1 | 3/2003 | Doumit et al. |
| 2008/0196509 A1* | 8/2008 | Charette .................. G01V 9/02 73/861.07 |

(Continued)

FOREIGN PATENT DOCUMENTS

| CN | 103353322 | 10/2013 |
| CN | 103364320 | 10/2013 |

(Continued)

OTHER PUBLICATIONS

"International Search Report (Form PCT/ISA/210)", dated Feb. 3, 2017, with English translation thereof, pp. 1-6.

*Primary Examiner* — Clayton E. LaBalle
*Assistant Examiner* — Dennis Hancock
(74) *Attorney, Agent, or Firm* — JCIPRNET

(57) ABSTRACT

Provided are a water engineering seepage behavior fusing and sensing system and method. The system comprises a seepage-hidden optical fiber locating device, a seepage flow velocity distributed optical fiber monitoring device, an online seepage line diagnosis device and a seepage behavior optical fiber self-adaptive identification device, the location of a water engineering seepage point is realized by using the seepage-hidden optical fiber locating device, then, the seepage flow velocity of a water engineering is monitored by virtue of the seepage flow velocity distributed optical fiber monitoring device, the online diagnosis of a seepage line on a section of a whole water engineering structure can be realized by using the online seepage line diagnosis device, and finally, the current seepage behavior is integrally monitored and evaluated by using the seepage behavior optical fiber self-adaptive identification device, so that the water engineering seepage behavior fusing and sensing is completed. The optical information change of the optical fiber is acquired from multiple aspects and angles by using the four water engineering seepage monitoring devices, depending (Continued)

on the material and mechanical properties of the water engineering and relying on a distributed optical fiber monitoring technology, and furthermore, the monitoring and sensing of a seepage behavior of a water engineering are indirectly completed.

18 Claims, 8 Drawing Sheets

(51) Int. Cl.
    *G01M 3/38*     (2006.01)
    *G01M 3/16*     (2006.01)

(56) References Cited

U.S. PATENT DOCUMENTS

| | | | |
|---|---|---|---|
| 2010/0092241 A1* | 4/2010 | Arshad | G06K 9/00651 405/52 |
| 2012/0317777 A1* | 12/2012 | Cajiga | B67D 99/00 29/428 |
| 2012/0318406 A1* | 12/2012 | Cajiga | B67D 7/04 141/98 |
| 2018/0321385 A1* | 11/2018 | Embry | G01M 3/04 |

FOREIGN PATENT DOCUMENTS

| | | |
|---|---|---|
| CN | 103364321 | 10/2013 |
| CN | 103412142 | 11/2013 |
| CN | 104570148 | 4/2015 |
| CN | 204514426 | 7/2015 |
| CN | 104977233 | 10/2015 |
| CN | 105181362 | 12/2015 |
| CN | 105716686 | 6/2016 |
| CN | 105716795 | 6/2016 |
| CN | 105738140 | 7/2016 |
| CN | 105738147 | 7/2016 |
| CN | 105738652 | 7/2016 |
| CN | 205719595 | 11/2016 |

* cited by examiner

WATER ENGINEERING SEEPAGE BEHAVIOR FUSING AND SENSING SYSTEM AND METHOD

CROSS-REFERENCE TO RELATED APPLICATION

This application is a 371 of international application of PCT application serial no. PCT/CN2016/103222, filed on Oct. 25, 2016, which claims the priority benefit of China application no. 201610294922.7, filed on May 5, 2016. The entirety of each of the above-mentioned patent applications is hereby incorporated by reference herein and made a part of this specification.

TECHNICAL FIELD

The present invention relates to a water engineering seepage behavior fusing and sensing system and method and belongs to the field of safety monitoring of hydraulic engineering and hydropower engineering.

BACKGROUND ART

Seepage is one of the most common hidden dangers in a service process of a water engineering such as a dam, a dike and a sluice, is resulted from complex reasons and is strong in randomness and high in monitoring difficulty, particularly, the damage of more than ⅓ of an earth-rock dam engineering is resulted from seepage and various problems derived from seepage, and it is very possible to result in a serious consequence of engineering outburst if the seepage is not found in time and corresponding rescue measures are not adopted. A great number of engineering practices prove that the enhancement of supervising and monitoring of water engineering seepage is of great significance to guarantee the safe and reliable operation of the engineering. However, most devices, instruments, technologies and the like used for seepage location at present are used with the help of point sensors by which a leak detection phenomenon occurs occasionally, and most traditional seepage sensors have the defects such as large size, great leading wire amount and poor affinity. A distributed optical fiber seepage monitoring technology has obvious advantages on the aspect of avoiding the phenomena, but needs to be assisted by artificial heat/electrical power equipment, has special requirements for sensing optical fibers and is limited by hydraulic engineering characteristics such as severe monitoring environments and hard layout conditions, the monitoring cost of the technology is greatly increased, the monitoring precision of the technology is seriously affected, the popularization of engineering practicability is hindered and constrained, and therefore, a seepage-hidden optical fiber locating device is developed.

For a water engineering such as a river levee, a seawall, a dam and a sluice, seepage hidden dangers occur occasionally under a long-term water load action, and the total quantity of a seepage water body and the behavior of a seepage flow velocity cannot be identified reliably and precisely by using a conventional and direct monitoring means, so that researching an advanced, practical and reliable seepage flow velocity behavior identifying device and method is an important issue attracting great concerns of engineering and academic circles all the time, however, the water engineering body seepage flow velocity monitoring research still stays at a research stage, a lot of problems urgent to be researched and solved on the aspects of a quantitative monitoring theory and an actual engineering layout application still exist, and therefore, it is urgent to develop a seepage flow velocity distributed optical fiber monitoring device which is simple in theory, strong in practicability and convenient to use for a long term based on the water engineering seepage monitoring characteristic and the special working environment.

For the sensing of a dam seepage line, various defects such as low precision, poor anti-electromagnetic interference capacity, incapability of realizing distributed monitoring, short service life, large size, great leading wire amount and poor affinity generally exist in a traditional technology. For a relatively novel optical fiber sensing technology, a maturational distributed optical fiber sensing theory for a seepage line is not established at present, especially, necessary monitoring means and technologies are lacked on the aspects of actual application and popularization, and therefore, it is urgent to develop an online seepage line diagnosis device which is simple in theory, strong in practicability and convenient to use for a long term based on the water engineering seepage monitoring characteristic and the special working environment.

The realization of real-time efficient monitoring of the seepage behavior of the water engineering is of great significance to guarantee the safe service, particularly, the seepage problem of earth-rock particle structures such as earth-rock dams and dikes and influences of the seepage problem are more prominent, it is especially needed that the efficient sensing of the seepage behavior is enhanced and potential safety hazards are found in time, an optical fiber sensing technology serving as an interdisciplinary novel technology receives great attention in the field of safety monitoring of the water engineering due to good mechanical properties and low production cost, however, a lot of problems are to be solved and relieved in the actual engineering application of distributed optical sensing for the seepage behavior of the water engineering due to the specificity such as working environments and structural characteristics, and therefore, a seepage behavior optical fiber self-adaptive identification device which is simple in theory, strong in practicability and convenient to use for a long term is developed.

SUMMARY OF THE INVENTION

Purpose of the invention: in order to overcome defects existing in the existing technology, the present invention provides a water engineering seepage behavior fusing and sensing system and method by which the monitoring and sensing of a seepage behavior of a water engineering can be completed at long distance, high precision, high spatial resolution and high sensing speed.

Technical solution: in order to solve the technical problem, the water engineering seepage behavior fusing and sensing system provided by the present invention comprises a seepage-hidden optical fiber locating device, a seepage flow velocity distributed optical fiber monitoring device, an online seepage line diagnosis device and a seepage behavior optical fiber self-adaptive identification device, the location of a water engineering seepage point is realized by using the seepage-hidden optical fiber locating device, then, the seepage flow velocity of the water engineering is monitored by virtue of the seepage flow velocity distributed optical fiber monitoring device, the online diagnosis of a seepage line on a section of a whole hydraulic structure can be realized by using the online seepage line diagnosis device, and finally, the current seepage behavior is integrally monitored and evaluated by using the seepage behavior optical fiber self-adaptive identification device, so that the fusing and sensing of the seepage behavior of the water engineering are completed.

The seepage-hidden optical fiber locating device comprises an energy system and a monitoring system, the energy system comprises a mobile device, a T-shaped connecting and guiding platform located above the mobile device and a plurality of bearing platforms located on the T-shaped connecting and guiding platform, the bearing platforms are provided with solar cell panels, the solar cell panels are connected with electric accumulators, and the electric accumulators are connected with a multi-angle interface arranged on the mobile device; the monitoring system comprises a rotary connection controller, a plurality of electronic monitoring platforms and temperature control monitoring platforms, the rotary connection controller is respectively connected with through hard pipes and a through hose located above a to-be-monitored region, each of the through hard pipes and the through hose is provided with a control valve, the through hard pipes are connected with a plurality of water transfer outlets by water pressure valves, the water transfer outlets are connected with a dispersed water transfer hole and a centralized water transfer hole by rotary connection rings, and the tail end of the through hose is of a multi-degree-of-freedom port; a plurality of temperature control slotted holes are distributed in the to-be-monitored region, monitoring platform barrels are mounted in the temperature control slotted holes, a plurality of electronic monitoring platforms are sequentially arranged from bottom to top in each monitoring platform barrel, and the temperature control monitoring platforms connected with the electronic monitoring platforms are arranged above the temperature control slotted holes in the surface of the to-be-monitored region; and crisscross sensing optical cables are distributed in the to-be-monitored region and are connected with an optical fiber demodulator.

Preferably, the mobile device comprises a battery storage box, runners and swivels, the battery storage box is provided with runner slots, the runners are located in the runner slots and are connected with the battery storage box by swivel connecting rods, the swivel connecting rods are connected with the battery storage box by the swivels, and the multi-angle interface is located on the battery storage box; the T-shaped connecting and guiding platform is internally provided with a multistage lifting column which is mounted on the battery storage box; and two through hard pipes are provided, the through hose is located between the two through hard pipes, and the through hose and the two through hard pipes are shaped like a Chinese character Shan.

Preferably, three electronic monitoring platforms, including a first electronic monitoring platform, a second electronic monitoring platform and a third electronic monitoring platform, are sequentially arranged from bottom to top on each of the monitoring platform barrels and are respectively connected with a first temperature control monitoring platform, a second temperature control monitoring platform and a third temperature control monitoring platform; the outer surface of each of the monitoring platform barrels is provided with a heat conducting layer; three bearing platforms are provided, each of the bearing platforms is provided with one of the solar cell panels, and the included angles of the solar cell panels and a horizontal plane are respectively 45 degrees, 0 degree and 135 degrees; and the outsides of the optical cables are sleeved with heating net layers and hard guard rings.

Preferably, the seepage flow velocity distributed optical fiber monitoring device comprises resistant side columns and side column bodies, seepage receiving clamping slots located at the upper ends and outer channel frame bodies located at the lower ends are connected between the resistant side columns and the side column bodies, each of the seepage receiving clamping slots is sequentially provided with a plurality of funneled seepage receiving guide slots, the lower ends of the seepage receiving guide slots are connected with force transfer monitoring barrels in which flow-assisted force transfer bodies are arranged, the lower ends of the flow-assisted force transfer bodies are connected with elastic accommodating sacs, and each of the flow-assisted force transfer bodies is provided with a circle of double-sided elastic bodies; one end of each of the outer channel frame bodies is provided with an initial fiber locking end on which a transition runner is arranged, the resistant side columns are provided with laser excitation sources connected with the sensing optical cables, the outer channel frame bodies are provided with optical fiber channels, the sensing optical cables are connected with light source detectors located on the side column bodies after sequentially passing through the transition runners, the optical fiber channels and tail fiber locking ends located on the side column bodies; and the elastic accommodating sacs are pressed on the sensing optical cables in a downward moving process due to the up-and-down movement of the double-sided elastic bodies.

Preferably, water converging honeycomb holes are formed in the seepage receiving clamping slots, the initial fiber locking end is provided with a locking device for locking the sensing optical cables, the locking device comprises a horizontal plate and a pair of fixture bodies symmetrically distributed along the horizontal plate, the horizontal plate is located between a left baffle plate and a right baffle plate which are located on a supporting platform, the fixture bodies are connected with a moving plate by vertical guide rods, a horizontal groove is faulted in the horizontal plate, the vertical guide rods move along the horizontal groove, the moving plate is connected with a vertical riveting rod passing through the horizontal groove, two ends of the vertical riveting rod are provided with nuts, and the moving plate moves to drive the fixture bodies to move, so that the sensing optical cables are clamped by the fixture bodies; each of the fixture bodies comprises a guide cross rod, an axial pulling and pressing column and a handheld resistant body, one end of each guide cross rod is connected with the vertical guide rods, the other end of the guide cross rod is connected with the axial pulling and pressing column sleeving a transverse main shaft, the transverse main shaft is fixedly arranged on the left baffle plate or the right baffle plate, and a transverse pulling and pressing column is connected with the arc-shaped handheld resistant body; and the top ends of the resistant side columns are triangular sharp slopes, and a plurality of inclined water diversion reverse holes and water guide and bottom drainage holes are formed in the side surfaces of the seepage receiving guide slots.

Preferably, the online seepage line diagnosis device comprises an input end guiding and connecting device, an inner frame body device, an output end guiding and connecting device and an outer matching body device, the input end guiding and connecting device is connected with the inner frame body device by a first port platform, and the inner frame body device is connected with the output end guiding and connecting device by a second port platform and is connected with the outer matching body device by a transverse guide rod. The input end guiding and connecting device comprises a gas pressure locking and connecting module and a fiber bearing and communicating module, the gas pressure locking and connecting module comprises a middle arc-shaped pressure head and a gas guide column, the middle arc-shaped pressure head and the gas guide column are sealed by a pressure head transition end to form a concave gas accommodating tank, external gases enter by a gas guide hole outside the gas guide column, the tail end of the gas guide column is of a conical gas passage communicating with a gas storage tank, the gas storage tank is internally provided with a first fiber guide crossing passing through a gas storage passage, the input end of a sensing optical fiber passes through the first fiber guide crossing, the conical gas passage is pushed open by the external gases, the external gases are introduced into the gas storage tank, the gas storage tank presses against the first fiber guide crossing by virtue of gases filled in the gas storage tank, and the pressing degree is regulated by using a handle and an exhaust passage; and the fiber bearing and communicating module comprises an outer hard protecting layer in which an inner soft connecting layer is connected, the inner soft connecting layer inwards clings to a second fiber guide crossing, and the input end of the sensing optical fiber enters an inner frame body after passing through the second fiber guide crossing.

The inner frame body device comprises a vertical bearing platform, a middle connecting column, fiber bearing shafts, an excircle bearing wall and sensing optical fibers, the vertical bearing platform and the middle connecting column are provided with the plurality of fiber bearing shafts, the sensing optical fibers are distributed in an S shape by the fiber bearing shafts distributed on the vertical bearing platform and the middle connecting column, each of the fiber bearing shafts is a double-spiral channel and can be distributed with two of the sensing optical fibers in parallel, and the middle connecting column is located in the excircle bearing wall.

The output end guiding and connecting device comprises a groove pressure locking module and a fiber bearing and fixing module, the groove pressure locking module comprises a rotating handle and a rotating rod, the rotating handle is connected with the rotating rod, the rotating handle rotates to drive the rotating rod to rotate, the rotating rod is connected with a connecting cone after passing through a spherical shaft and is in threaded connection with the connecting cone, the spherical shaft is connected with frame fixing rods fixedly arranged on the second port platform which is fixedly arranged on the vertical bearing platform, and the connecting cone is connected with a T-shaped cross rail and moves up and down to drive the T-shaped cross rail to run up and down; and the fiber bearing and fixing module comprises a fiber guide groove parallel to the T-shaped cross rail, and the sensing optical fibers are transitioned into the fiber guide groove by the traction of the fiber bearing shafts.

The outer matching body device comprises an outer frame body module and an electromechanical assembly module, the outer frame body module comprises a guide rod screw head, a guide rod bolt and a transverse guide rod, the guide rod screw head and the guide rod bolt are mounted on the transverse guide rod which is located on the vertical bearing platform, the guide rod screw head and the guide rod bolt are used for fixing an unfolded beam on the transverse guide rod, the lower bottom surface of the transverse guide rod is equipped with a fiber bearing box in which a fiber bearing plate capable of bearing input and output ends of the sensing optical fibers is placed, and a channel allowing cables to pass through is formed in the transverse guide rod; and the electromechanical assembly module comprises a motor box, the cables are connected with the motor box, and the motor box drives a rotary rolling shaft to rotate at high speed, and furthermore, a semicircular turnplate connected with the rotary rolling shaft is driven to rotate.

Preferably, a plurality of round holes are distributed in the outer side of the vertical bearing platform, the input end guiding and connecting device and the output end guiding and connecting device are fixedly arranged in the round holes by port ear handles, the vertical bearing platform is parallel to the middle connecting column and is tangent to the excircle bearing wall, and the same input end guiding and connecting device, inner frame body device, output end guiding and connecting device and outer matching body device are distributed by taking the middle connecting column as a symmetry axis.

Preferably, the seepage behavior optical fiber self-adaptive identification device comprises main folded plates which are symmetrically distributed and frame-shaped vertical pressure bearing beams which are symmetrically distributed, one end of each of the two main folded plates is hinged with a storage battery, the other end of each of the two main folded plates is hinged with a connecting rod, two sides of the main folded plates are provided with transverse folded plates, vertical folded plates connected with the main folded plates are mounted above the main folded plates, and the storage batteries are connected with pressure water inlet tanks by using guide wires; and each of the vertical pressure bearing beams is sequentially provided with a first medium bearing beam, a second medium bearing beam and a third medium bearing beam from top to bottom, at least two lane changing holes are formed in each of the first medium bearing beam, the second medium bearing beam and the third medium bearing beam, a space defined by the vertical pressure bearing beam, the first medium bearing beam, the second medium bearing beam and the third medium bearing beam is filled with earth-rock particles, the top of each of the vertical pressure bearing beams is provided with an upper hole bearing beam, optical fiber threading top holes are formed in two ends of the upper hole bearing beam, shunting tanks are formed in the upper hole bearing beams, single shunting holes penetrating through the upper hole bearing beams are formed in the shunting tanks, and the shunting tanks are communicated with the pressure water inlet tanks.

Preferably, the main folded plates are of telescopic structures, each of the vertical pressure bearing beams is provided with a plurality of guiding and communicating pipes which are connected with resistance thermometers located in the vertical pressure bearing beams, the vertical folded plates are vertical to the main folded plates and the transverse folded plates, the transverse folded plates are fixedly arranged on the main folded plates in parallel by transverse folded plate connecting shafts, the single shunting holes are symmetrically distributed along a symcenter of the main folded plates, and the number of the single shunting holes formed in one side is an odd number.

A method of the water engineering seepage behavior fusing and sensing system comprises the following steps:

Firstly, assembling the seepage-hidden optical fiber locating device, the seepage flow velocity distributed optical fiber monitoring device, the online seepage line diagnosis device and the seepage behavior optical fiber self-adaptive identification device, determining the to-be-buried number of the four devices, connecting the four devices by using the sensing optical cables, and then, carrying out burying and mounting.

Secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each device.

Thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

Beneficial effects: the water engineering seepage behavior fusing and sensing system provided by the present invention is capable of running at long distance, high precision, high spatial resolution and high running speed by fusing the seepage-hidden optical fiber locating device, the seepage flow velocity distributed optical fiber monitoring device, the online seepage line diagnosis device and the seepage behavior optical fiber self-adaptive identification device, so that the monitoring precision and efficiency are increased, the seepage identification degree is remarkably increased, and the advantages on the aspects of the monitoring cost reduction and engineering practicability are prominent.

DETAILED DESCRIPTION OF THE INVENTION

Figure 1:
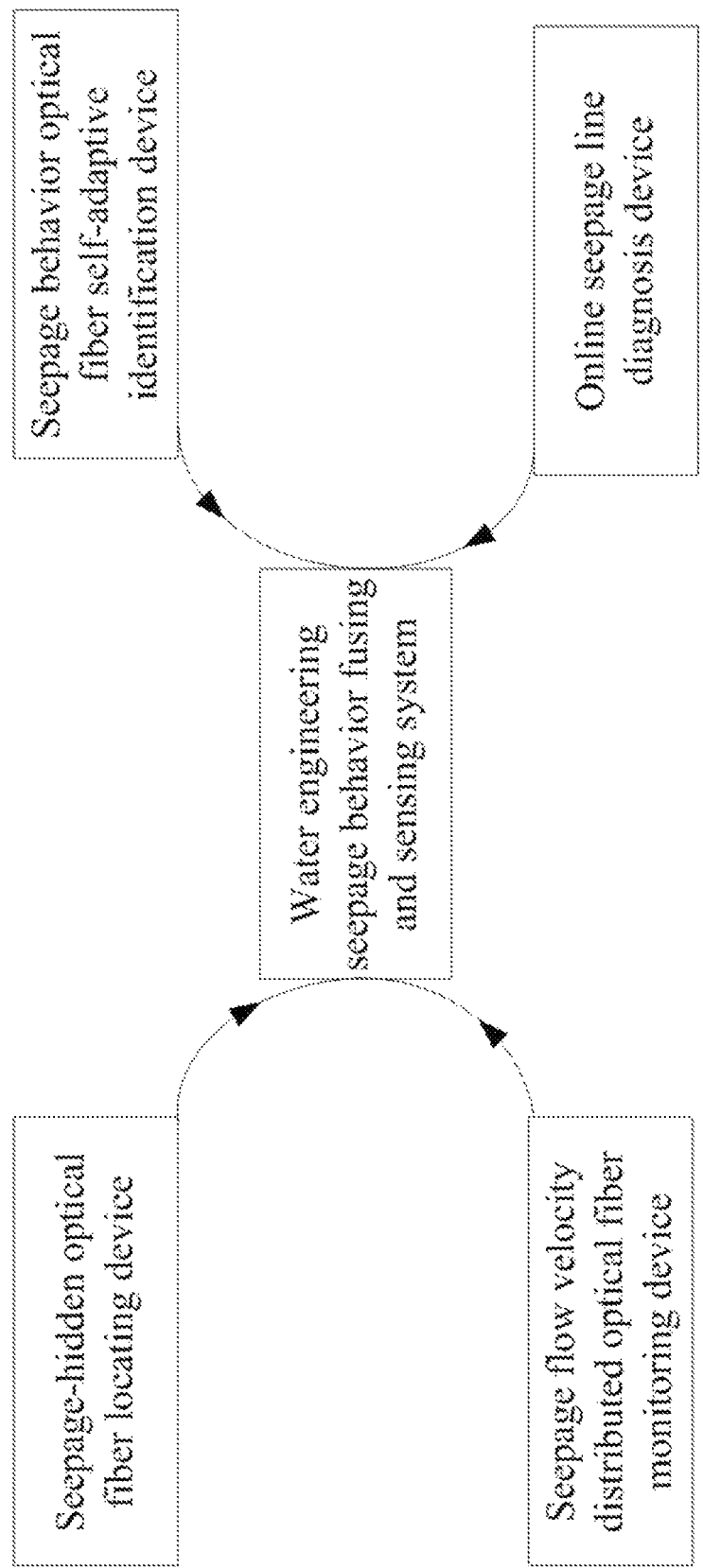
FIG. 1 is a schematic diagram of a theory of the present invention.
Figure 2:
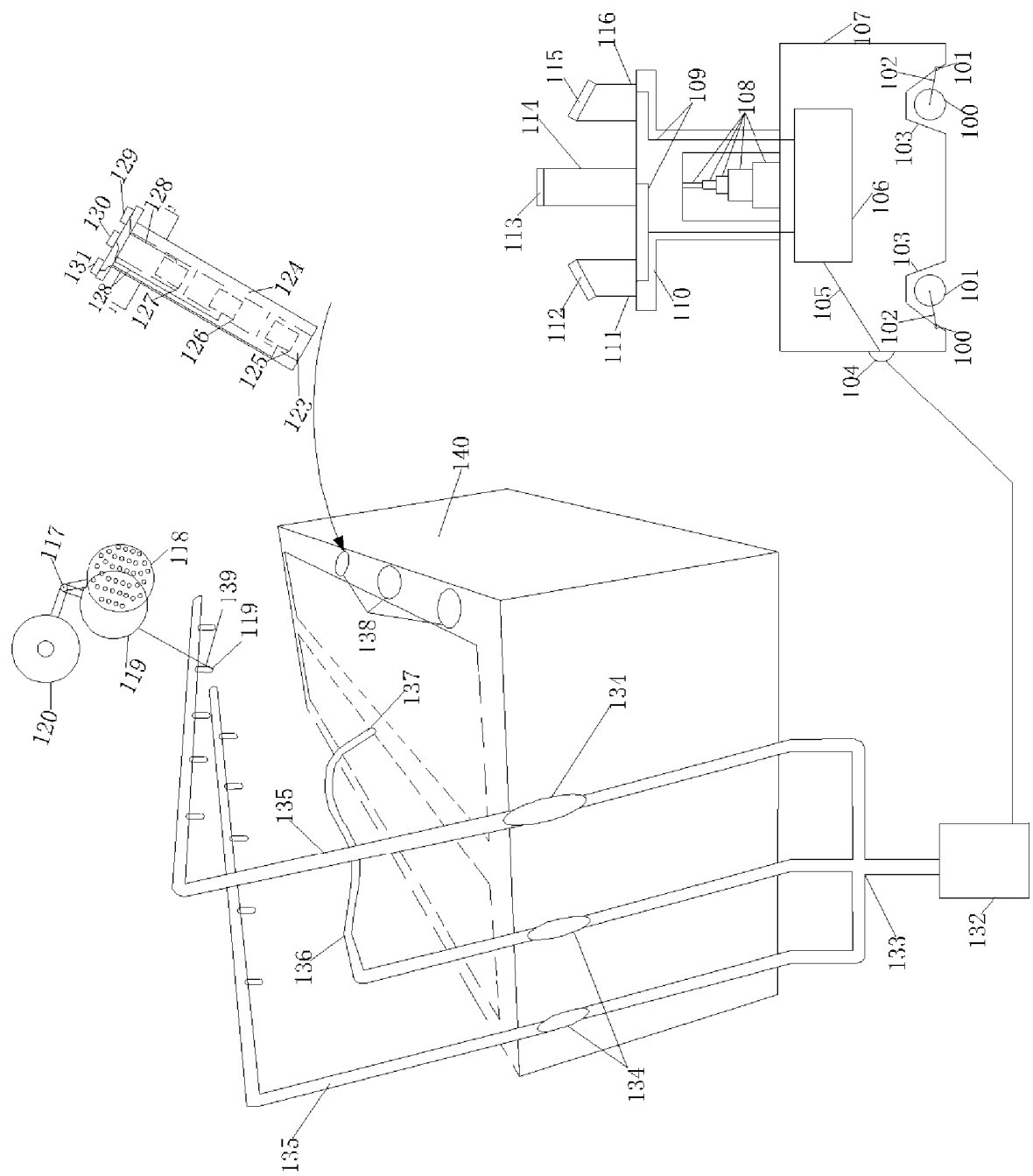
FIG. 2 is a schematic diagram of a seepage-hidden optical fiber locating device in FIG. 1.
Figure 3:
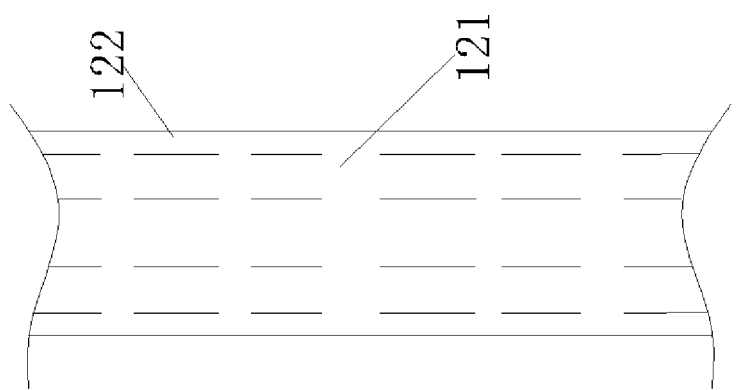
FIG. 3 is a structural schematic diagram of a heating net layer and a hard guard ring in the seepage-hidden optical fiber locating device.
Figure 4:
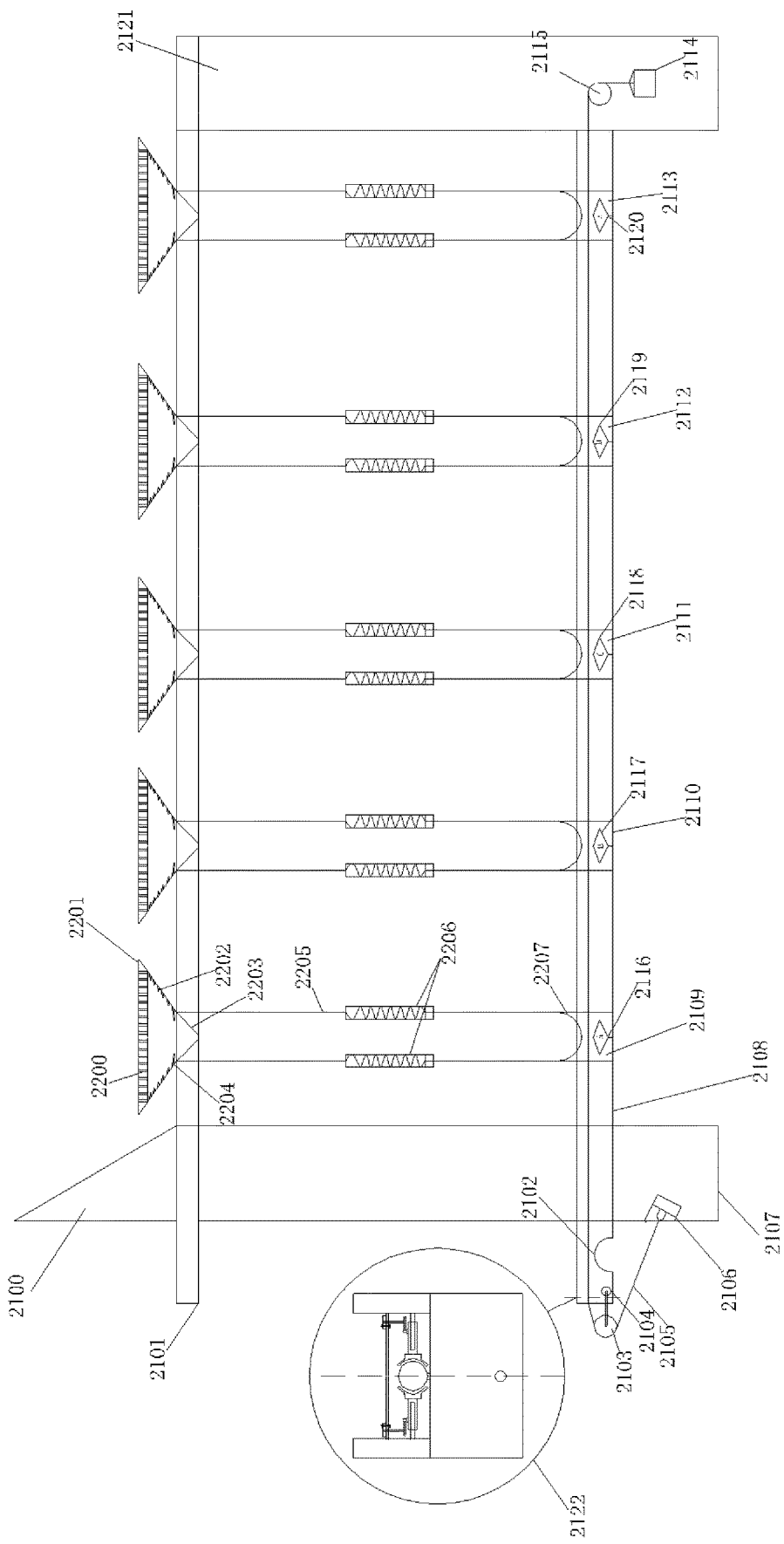
FIG. 4 is a schematic diagram of a seepage flow velocity distributed optical fiber monitoring device in FIG. 1.
Figure 5:
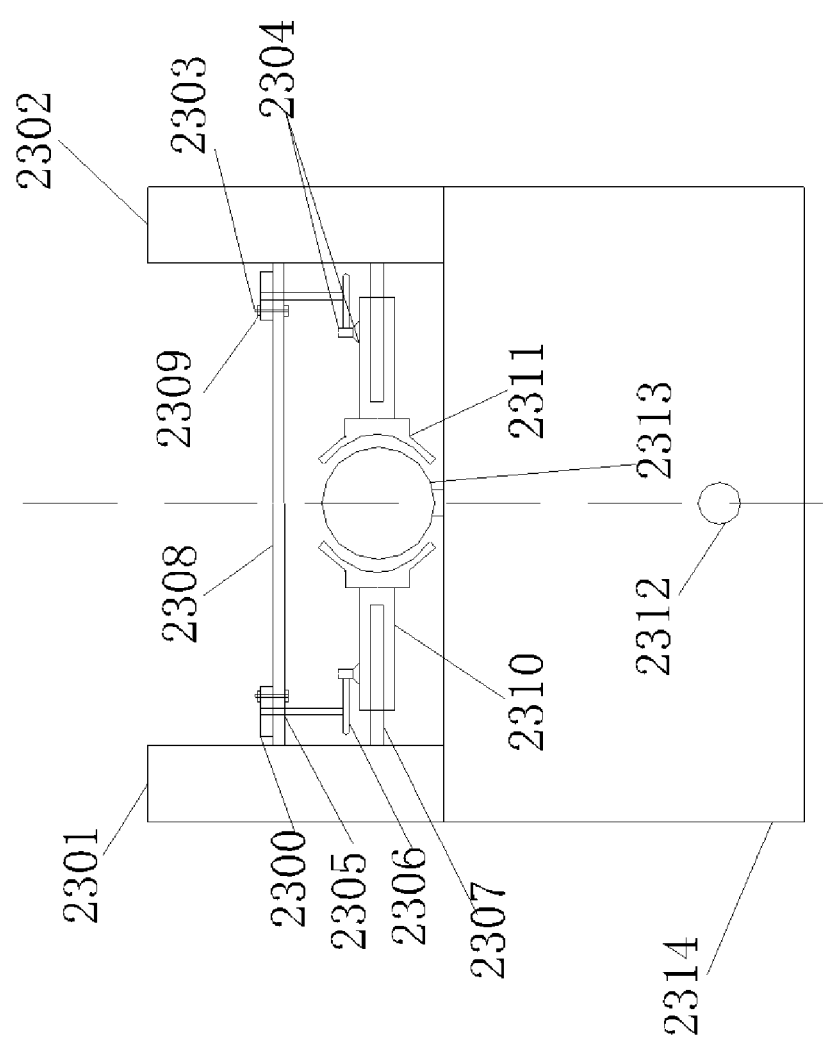
FIG. 5 is a detailed structural diagram of an initial fiber locking end in the seepage flow velocity distributed optical fiber monitoring device.
Figure 6:
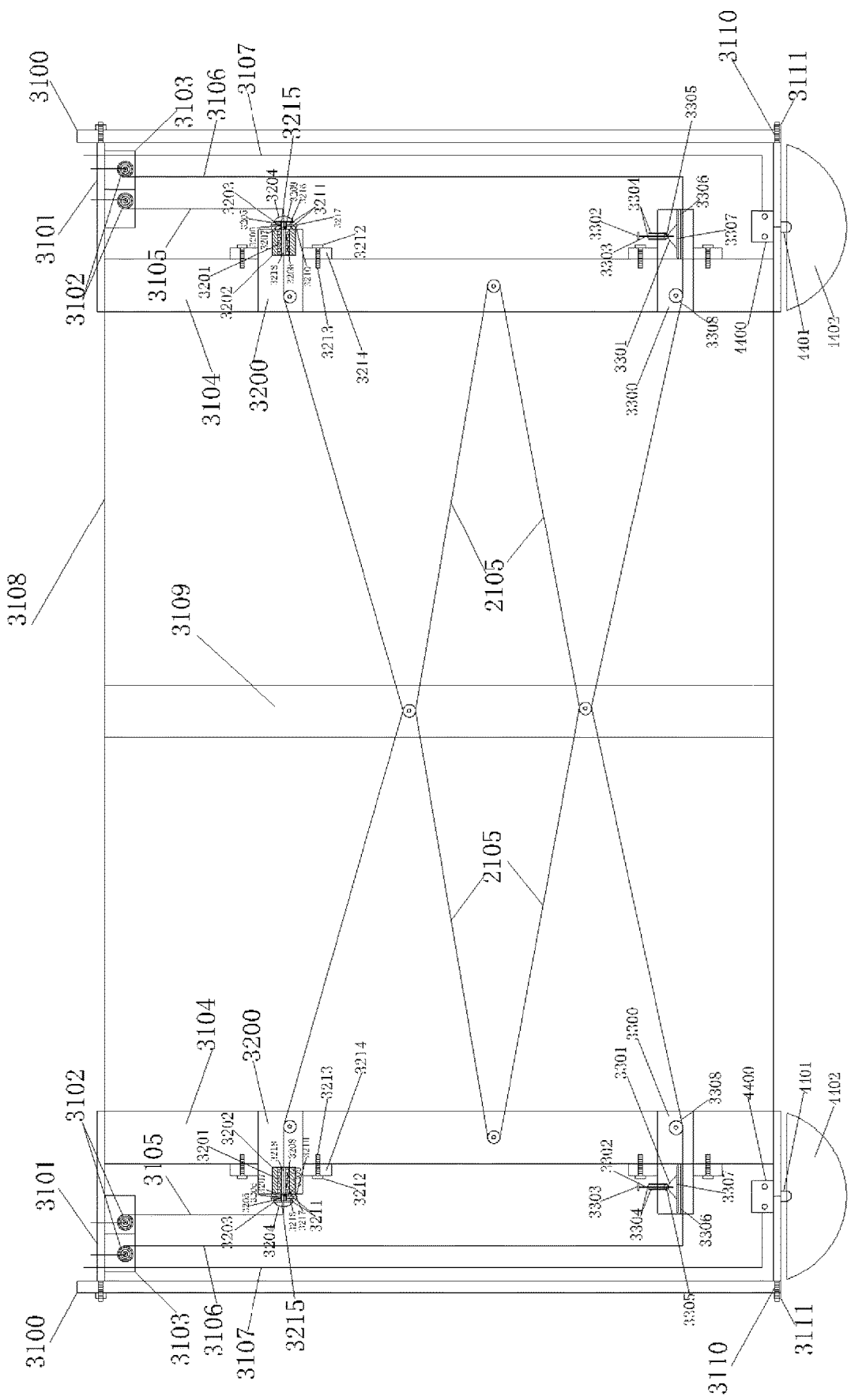
FIG. 6 is a schematic diagram of an online seepage line diagnosis device in FIG. 1.
Figure 7:
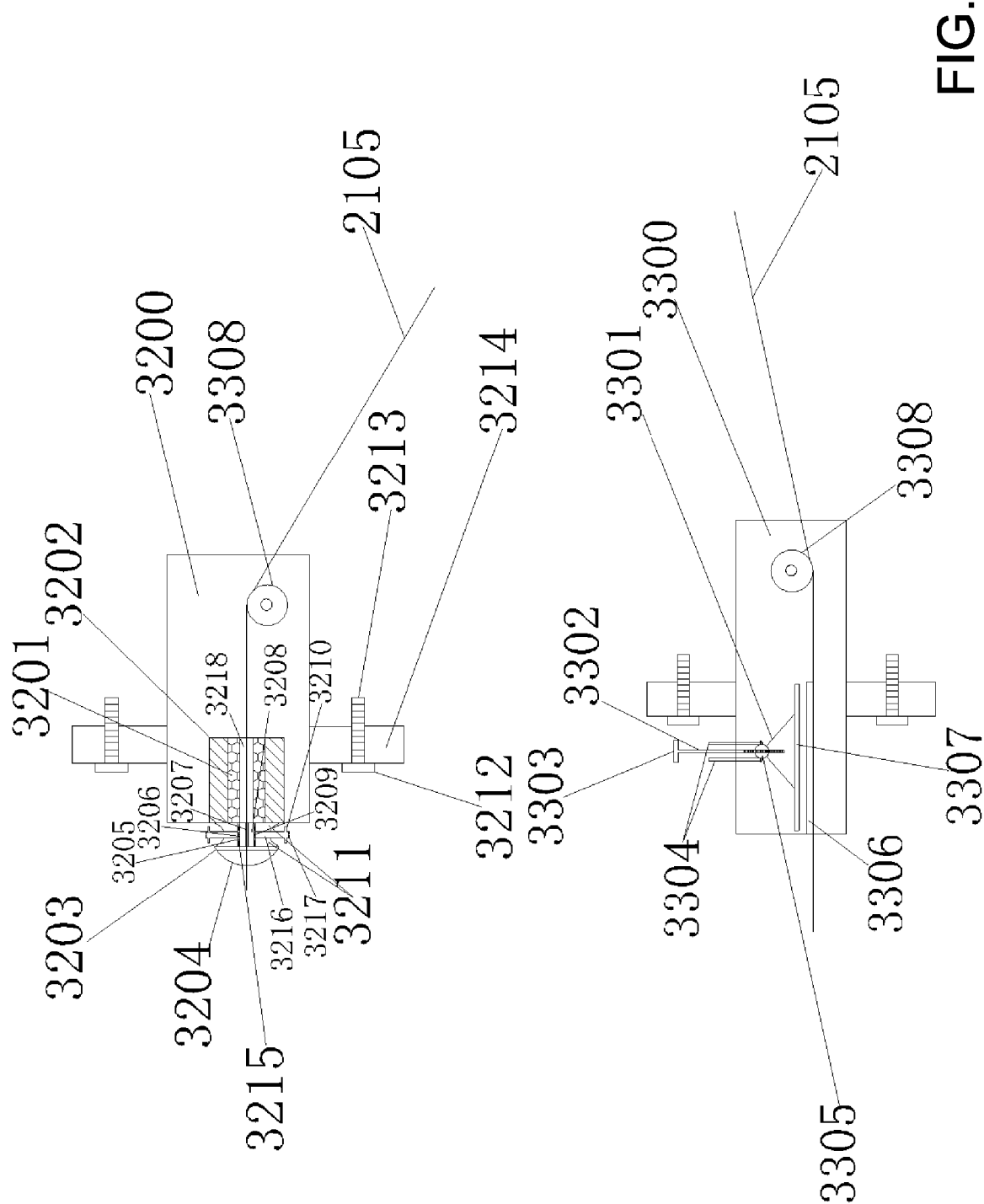
FIG. 7 is a detailed structural diagram of an input end guiding and connecting module and an output end guiding and connecting module in the online seepage line diagnosis device.
Figure 8:
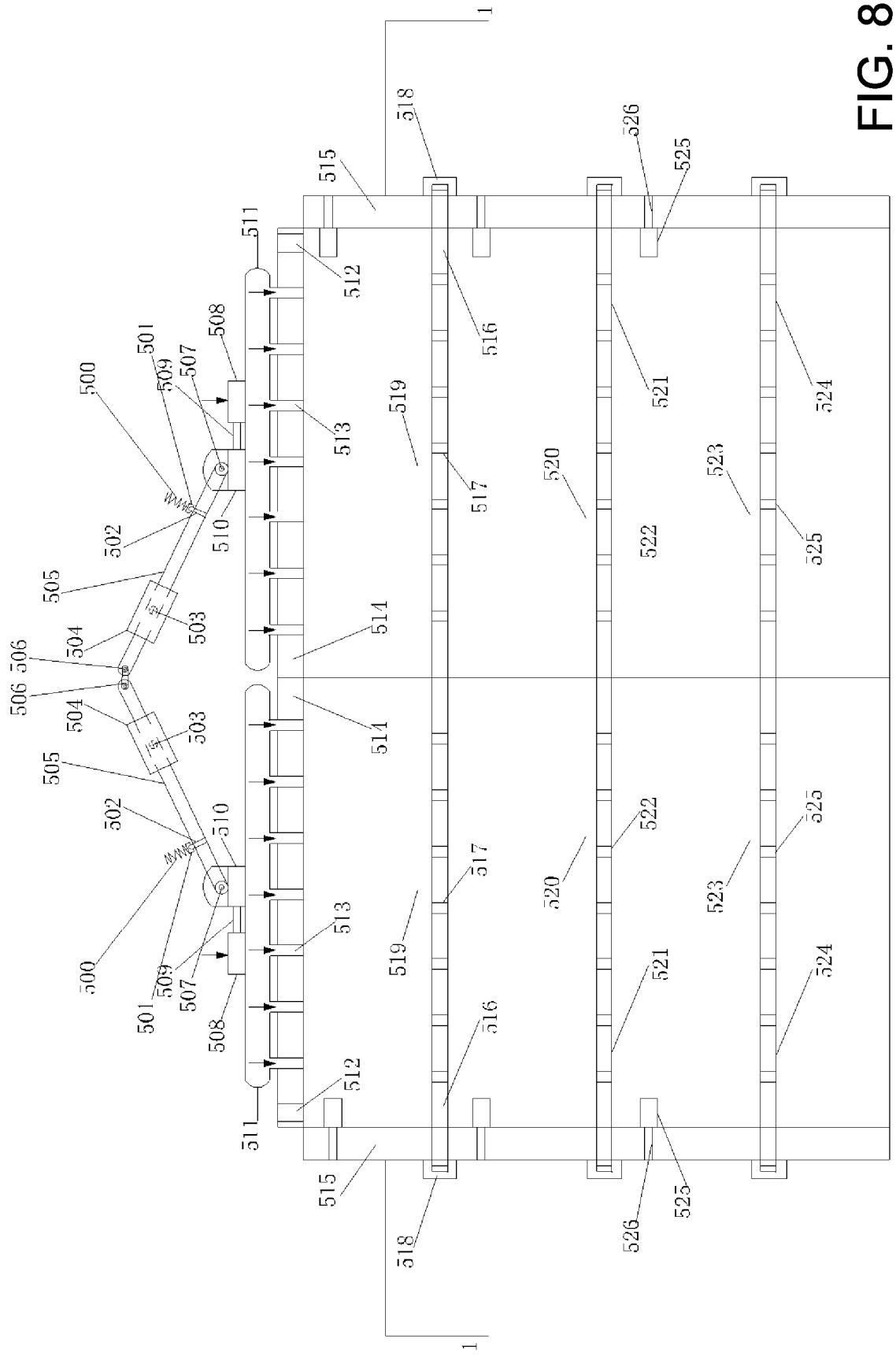
FIG. 8 is a schematic diagram of a seepage behavior optical fiber self-adaptive identification device in FIG. 1.

As shown in FIG. 1 to FIG. 8, a water engineering seepage behavior fusing and sensing system provided by the present invention comprises a seepage-hidden optical fiber locating device, a seepage flow velocity distributed optical fiber monitoring device, an online seepage line diagnosis device and a seepage behavior optical fiber self-adaptive identification device, wherein the location of a water engineering seepage point is realized by using the seepage-hidden optical fiber locating device, then, the seepage flow velocity of a water engineering is monitored by virtue of the seepage flow velocity distributed optical fiber monitoring device, the online diagnosis of a seepage line on a section of a whole hydraulic structure can be realized by using the online seepage line diagnosis device, and the current seepage behavior is integrally monitored and evaluated by using the seepage behavior optical fiber self-adaptive identification device, and furthermore, the fusing and sensing of the seepage behavior of the water engineering are completed systematically.

In the present invention, the seepage-hidden optical fiber locating device comprises an energy module and a monitoring module, the energy module comprises a mobile assembly, a T-shaped connecting and guiding platform 110 located above the mobile assembly and a plurality of bearing platforms located on the T-shaped connecting and guiding platform 110, the bearing platforms are provided with solar cell panels, the solar cell panels are connected with electric accumulators 106, and the electric accumulators 106 are connected with a multi-angle interface 104 arranged on the mobile device; the monitoring module comprises a rotary connection controller 132, a plurality of electronic monitoring platforms and temperature control monitoring platforms, the rotary connection controller 132 is respectively connected with through hard pipes 135 and a through hose 136 located above a to-be-monitored region 140, each of the through hard pipes 135 and the through hose 136 is provided with a control valve 134, the through hard pipes 135 are connected with a plurality of water transfer outlets 119 by water pressure valves 139, the water transfer outlets 119 are connected with a dispersed water transfer hole 118 and a centralized water transfer hole 120 by rotary connection rings 117, and the tail end of the through hose 136 is of a multi-degree-of-freedom port 137; a plurality of temperature control slotted holes 138 are distributed in the to-be-monitored region 140, monitoring platform barrels 123 are mounted in the temperature control slotted holes 138, a third electronic monitoring platform 125, a second electronic monitoring platform 126 and a first electronic monitoring platform 127 are sequentially arranged from bottom to top in each monitoring platform barrel 123, and a third temperature control monitoring platform 131, a second temperature control monitoring platform 130 and a first temperature control monitoring platform 129 connected with the three electronic monitoring platforms are arranged above the temperature control slotted holes 138 in the surface of the to-be-monitored region 140; and crisscross ZTT-GYXTW-4A1a type sensing optical cables 2105 are distributed in the to-be-monitored region 140, the outsides of the cables are sleeved with heating net layers 121 and hard guard rings 122, in order to better apply the sensing optical cables 2105 with various types and sizes to seepage monitoring to reduce cost loss, a part with a structure comprising the heating net layers 121 and the hard guard rings 122 is designed, the hard guard rings 122 of the part are mainly used for preventing electric leakage of the heating net layers 121 and protecting internal structures, and the sizes of the heating net layers 121 can be regulated so that the sensing optical cables 2105 are effectively mounted in the heating net layers 121 to form a to-be-monitored heat source.

In the present invention, the mobile assembly comprises a battery storage box 107, runners 101 and swivels 100, the battery storage box 107 is provided with runner slots 103, the runners 101 are located in the runner slots 103 and are connected with the battery storage box 107 by swivel connecting rods 102, the swivel connecting rods 102 are connected with the battery storage box 107 by the swivels 100, and the multi-angle interface 104 is located on the battery storage box 107; the T-shaped connecting and guiding platform is internally provided with a multistage lifting column 108 which is mounted on the battery storage box 107; two through hard pipes 135 are provided, the through hose 136 is located between the two through hard pipes 135, and the through hose 136 and the two through hard pipes 135 are shaped like a Chinese character Shan; and three electronic monitoring platforms, including the first electronic monitoring platform 127, the second electronic monitoring platform 126 and the third electronic monitoring platform 125, are sequentially arranged from bottom to top on each of the monitoring platform barrels 123 and are respectively connected with the first temperature control monitoring platform 129, the second temperature control monitoring platform 130 and the third temperature control monitoring platform 131; three bearing platforms which are respectively a first fixed bearing platform 111, a second fixed bearing platform 116 and a third fixed bearing platform 114 are provided, each of the bearing platforms is provided with one of the solar cell panels, and the included angles of the solar cell panels and a horizontal plane are respectively 45 degrees, 0 degree and 135 degrees.

In the present invention, the seepage flow velocity distributed optical fiber monitoring device comprises a force transfer monitoring barrel module, a fiber locking and fixing module and an optical fiber conducting module; the force transfer monitoring barrel module is connected with the optical fiber conducting module by seepage receiving clamping slots 2101 and outer channel frame bodies 2108, and the fiber locking and fixing module is connected with the optical fiber conducting module by initial fiber locking ends 2122 and tail fiber locking ends 2115; and the force transfer monitoring barrel module comprises flow-assisted force transfer bodies 2205 for constructing a framework structure of the force transfer monitoring barrel module, the fiber locking and fixing module comprises the initial fiber locking ends 2122 and the tail fiber locking ends 2115, and the optical fiber conducting module comprises laser excitation sources 2106 and runner slots 2102 which are used for constructing a framework structure of the optical fiber conducting module.

In the present invention, the top ends of force transfer monitoring barrels 2109 are distributed with seepage receiving guide slots 2201, water converging honeycomb holes 2200 fully distributed in the top surfaces of the seepage receiving guide slots 2201 are formed in the seepage receiving guide slots 2201, diversion flume bottom leakage holes 2203 are mounted in the bottom ends of the water converging honeycomb holes 2200, a plurality of layers of inclined water diversion reverse holes 2202 inclined towards the diversion flume bottom leakage holes are distributed in the peripheral side of the seepage receiving guide slots 2201, a row of water guide and bottom drainage holes 2204 are distributed in the bottom sides of the seepage receiving guide slots 2201, and double-sided elastic bodies 2206 are arranged on middle positions of the flow-assisted force transfer bodies 2205; the bottom ends of the force transfer monitoring barrels 2109 are provided with elastic accommodating sacs 2207, the seepage receiving guide slots 2201 are connected with the elastic accommodating sacs 2207 by the flow-assisted force transfer bodies 2205, and the elastic accommodating sacs 2207 are in direct contact with the sensing optical cables 2105 in the optical fiber conducting module; the bottom end of each of the initial fiber locking ends 2122 is provided with a force supporting platform 2314, the left and right sides on the force supporting platform 2314 are provided with a left blocking column 2301 and a right blocking column 2302, a horizontal groove 2308 is communicated between the left blocking column 2301 and the right blocking column 2302, the horizontal movement of vertical guide rods 2305 is controlled by mobile handles 2300 on the horizontal groove 2308, the vertical guide rods 2305 move to drive guide cross rods 2306 to horizontally move, the guide cross rods 2306 move to drive force transfer assembles 2304 to horizontally move, axial pulling and pressing columns 2310 sleeve transverse main shafts 2307, the axial pulling and pressing columns 2310 are driven by the force transfer assembles 2304 to apply circular loads to a sensing channel 2313 by virtue of handheld resistance bodies 2311, then, the movement of the sensing optical cables 2105 is controlled, furthermore, the fiber locking and fixing effects are achieved, and vertical riveting rods 2303 and screw slots 2309 are mounted at the left and right ends of the horizontal groove; and transition runners 2103 are fixedly arranged on sides, close to the initial fiber locking ends 2122, of outer channel frame bodies 2108 by using rotating handles 2104, the laser excitation sources 2106 are fixedly arranged at the lower end sides of resistant side columns 2107, the runner slots 2102 are arranged to be close to the rotating handles 2104, the transition runners 2103 can be mounted in the runner slots 2102, and the tail fiber locking ends 2115 and light source detectors 2114 are fixedly arranged in side column bodies 2121.

In the present invention, the online seepage line diagnosis device comprises an input end guiding and connecting module, an inner frame body module, an output end guiding and connecting module and an outer matching body module, the input end guiding and connecting module is connected with the inner frame body module by a first port platform 3200, the inner frame body module is connected with the output end guiding and connecting module by a second port platform 3300 and is connected with the outer matching body module by a transverse guide rod 3101, the input end guiding and connecting module is used for introducing ZTT-GYXTW-4A1a type input optical fibers 3105 to the inner frame body module by an air pressure locking and connecting assembly, the input optical fibers 3105 in the inner frame body module are staggered in an S shape between a vertical bearing platform 3104 with the height of 6 m and a middle connecting column 3109 with the height of 6 m by virtue of fiber bearing shafts 3308 with the diameters of 6 cm, the input optical fibers 3105 are introduced to the outer matching body module by virtue of a groove pressure locking module in the output end guiding and connecting module, a soil body in the inner fame body module is subjected to original sample monitoring by virtue of a rotary rolling shaft 3401 and a semicircular turnplate 3102 in the outer matching body module, the in-situ sampling analysis of the soil body in a dam model is realized by analyzing temperature change and a numerical relation between temperature change and in-situ water content, and then, the distributed sensing of a seepage line of the dam model is realized.

In the present invention, an arc-shaped pressure head with the diameter of 0.1 m in an air pressure locking and connecting module and a gas guide column are sealed by a pressure head transition end to form a concave gas accommodating tank, a ConST118 type portable pneumatic pump is prepared, an interface of the pneumatic pump is connected to a gas guide hole outside the gas guide column, the portable pneumatic pump is used for pushing external gases into a gas storage tank 3208 by virtue of a conical gas passage 3209, air pressure in the gas storage tank 3208 acts into a first fiber guide crossing 3207 with the diameter of 5 cm, the ZTT-GYXTW-4A1a type sensing optical cables 2105 are distributed in the first fiber guide crossing 3207, the tightness degrees of the sensing optical cables 2105 in the first fiber guide crossing 3207 are regulated by controlling a handle 3210 and an exhaust passage 3215, an inner soft connecting layer made of a TPEE material is connected to the inside of an outer hard protecting layer made of a GFRP material in a fiber bearing and communicating module and inwards clings to a second fiber guide crossing 3218 with the diameter of 5 cm.

In the present invention, the output end guiding and connecting module comprises the groove pressure locking assembly and a fiber bearing and fixing assembly, a rotating handle 3303 with the diameter of 2 cm in the groove pressure locking assembly is connected with a rotating rod 3302 with the diameter of 1 cm, the rotating handle 3303 rotates to drive the rotating rod 3302 with the length of 10 cm to rotate, frame fixing rods 3304 with the length of 10 cm are used for connecting a connecting cone 3301 with the height of 3 cm and a second port platform 3300 by virtue of a spherical shaft 3305, the connecting cone 3301 is connected with a T-shaped cross rail 3307 with the height of 3 cm and is used for controlling the up-and-down running of the T-shaped cross rail 3307; and a fiber guide groove 3306 with the depth of 3 cm in the fiber bearing and fixing module is parallel to the T-shaped cross rail 3307, port ear handles 3314 are fixedly arranged on the vertical bearing platform 3104 by using ear handle rods 3213, and the sensing optical cables 2105 are led into the fiber guide groove 3306 under the traction and transition of the fiber bearing shafts 3308.

In the present invention, the outer matching body module comprises an outer frame body assembly and an electromechanical assembly module, in the outer frame body assembly, an unfolded beam 3100 with the height of 6.5 m is fixed on the transverse guide rod 3101 with the length of 0.5 m by using a guide rod screw head 3110 and a guide rod bolt 3111, the lower bottom surface of the transverse guide rod 3101 is equipped with a fiber bearing box 3103 in which a fiber bearing plate 3102 with the diameters of 10 cm is placed, the fiber bearing plate 3102 is used for bearing ZTT-GYXTW-4A1 type output optical fibers 3106 and the input optical fibers 3105, and a channel allowing YJV22 type cables 3107 to pass through is formed in the transverse guide rod 3101; and the YJV22 type cables 3107 in the electromechanical assembly module is connected with a motor box 3400, the motor box 3400 is internally equipped with a three-phase asynchronous motor driving a rotary rolling shaft 3401 to rotate, and furthermore, a semicircular turnplate 3402 is driven to rotate.

In the present invention, the seepage behavior optical fiber self-adaptive identification device comprises a power module and an identification module; the power module comprises vertical folded plates 500, transverse folded plates 504 and main folded plates 505, the vertical folded plates 500 are connected with the main folded plates 505 by vertical folded plate through shafts 502, the transverse folded plates 504 are connected with the main folded plates 505 by transverse folded plate connecting shafts 503, the bottom ends of the vertical folded plates 500 are connected with vertical folded plate square grooves 501, the top ends of the main folded plates 505 are provided with connecting rods 506, the bottom ends of the main folded plates 505 are connected with storage batteries 510 by main folded plate bottom shafts 507, and the storage batteries 510 are connected with pressure water inlet tanks 508 by using power transmission lines 509; and the identification module comprises shunting tanks 511, first medium bearing beams 516, second medium bearing beams 521 and third medium bearing beams 524, the shunting tanks 511 are connected with upper hole bearing beams 514 by single shunting holes 513, optical fiber threading top holes 512 are also formed in the upper hole bearing beams 514, first lane changing holes 517 are formed in the first medium bearing beams 516, the first medium bearing beams 516 are connected with vertical pressure bearing beams 515 by vertical beam buckles 518, second lane changing holes 522 are formed in second medium bearing beams 520, third lane changing holes 525 are formed in third medium bearing beams 523, and the first medium bearing beams 516, the second medium bearing beams 521 and the third medium bearing beams 524 are connected with the vertical pressure bearing beams 515 by the vertical beam buckles 518.

In the present invention, a method for sensing a seepage behavior of a to-be-monitored region by using the water engineering seepage behavior fusing and sensing system comprises the following actual steps:

Firstly, the ZTT-GYXTW-4A1a type sensing optical cables 2105 are effectively assembled and configured by using the heating net layers 121 with fixed lengths and the hard guard rings 122 and are introduced to a Sentinel DTS-LR type distributed optical fiber temperature monitoring host after being buried in the to-be-monitored region, an E2000 connector is connected with the sensing optical cables 2105, a first solar cell panel 112 with an included angle of 45 degrees and a third solar cell panel 113 with an included angle of 90 degrees are used, the first solar cell panel 112 is mounted on a first fixed bearing platform 111, the third solar cell panel 113 is mounted on a third fixed bearing platform 114, a value is acquired by monitoring at a set moment, and then, the position with greater continuous change in a time history curve is determined by drawing the change of the time history curve and comparatively analyzing numerical values of all the electronic monitoring platforms on the monitoring platform barrels 123, so that the location and monitoring of seepage hidden dangers in the to-be-monitored region are realized.

Secondly, the sensing optical cables 2105 penetrate through the sensing channel 2313, then, the mobile handles 2300 at both sides are rotated to synchronously apply a circular constraint to the sensing channel 2313, the mobile handles 2300 are rotated to ensure that the axial pulling and pressing columns 2310 on the transverse main shafts 2307 generate a circumferential constraint to the sensing channel 2313, the sensing optical cables 2105 are dragged to pass through the transition runners 2103 with the diameters of 0.02 m, the initial ends of the sensing optical cables 2105 are introduced to Sapphire laser CF125 type laser excitation sources 2106, light source information is transmitted by the sensing optical cables 2105, the change of optical information which is transmitted by the laser excitation sources 2106 and passes through the sensing optical cables 2105 can be collected at the light source detectors 2114, the optical loss value of the optical fibers are statistically analyzed, then, a relational expression between the optical loss value of the optical fibers and the volume of a seepage water body is fitted, then, a relational expression between the optical loss value of the optical fibers and the seepage flow velocity is fitted, and furthermore, the real-time tracking of a water engineering seepage flow velocity distributed optical fiber is realized.

Thirdly, the second port platform 3300 is connected with the connecting cone 3301 by the frame fixing rods 3304, the rotating handles 3303 are rotated to drive the rotating rod 3302 to move up and down, the rotating rod 3302 moves up and down to drive the T-shaped cross rail 3307 to move up and down, the output optical fibers 3106 in the fiber guide groove 3306 can be tightly pressed when the T-shaped cross rail 3307 moves downwards, the output optical fibers 3106 and the input optical fibers 3105 are respectively connected to a Neubrex-6070 type distributed optical temperature strain demodulator after being wound for several circles by using the fiber bearing plate 3102 with the diameter of 10 cm, and the output optical fibers 3106 and the input optical fibers 3105 are marked so as to be compared with an actual result analyzed by the Neubrex-6070 type distributed optical temperature strain demodulator.

Fourthly, the connectivity of the sensing optical cables 2105 in the inner frame body module and the initial numerical values of the sensing optical cables 2105 under an idle condition are measured; the YJV22 type cables 3107 are led out of the transverse guide rod 3101 and are introduced to a ZH4105ZLD diesel engine generating set, the ZH4105ZLD diesel engine generating set is used as an outdoor power supply module of the monitoring system, then, the motor box 3400 is controlled to be started by the YJV22 type cables 3107, a relation between a temperature difference value and the water content of the soil body is acquired by a series of numerical value statistics based on the monitoring of the temperature difference value of the output optical fibers 3106 and the input optical fibers 3105 as well as the sensing optical cables 2105 in the inner frame body device, so that the monitoring of the water content at the position is completed, then, positions passed by the seepage line are determined, points at the positions passed by the seepage line are connected into a line, and thus, the sensing of the seepage line on a section of a dam can be completed.

Fifthly, the power module comprises vertical folded plates 500, transverse folded plates 504 and main folded plates 505, the vertical folded plates 500 are connected with the main folded plates 505 by vertical folded plate through shafts 502, the transverse folded plates 504 are connected with the main folded plates 505 by transverse folded plate connecting shafts 503, the bottom ends of the vertical folded plates 500 are connected with vertical folded plate square grooves 501, the top ends of the main folded plates 505 are provided with connecting rods 506, the bottom ends of the main folded plates 505 are connected with storage batteries 510 by main folded plate bottom shafts 507, and the storage batteries 510 are connected with pressure water inlet tanks 508 by using power transmission lines 509; and the identification module comprises shunting tanks 511, first medium bearing beams 516, second medium bearing beams 521 and third medium bearing beams 524, the shunting tanks 511 are connected with upper hole bearing beams 514 by single shunting holes 513, optical fiber threading top holes 512 are also formed in the upper hole bearing beams 514, first lane changing holes 517 are formed in the first medium bearing beams 516, the first medium bearing beams 516 are connected with vertical pressure bearing beams 515 by vertical beam buckles 518, second lane changing holes 522 are formed in second medium bearing beams 520, third lane changing holes 525 are formed in third medium bearing beams 523, and the first medium bearing beams 516, the second medium bearing beams 521 and the third medium bearing beams 524 are connected with the vertical pressure bearing beams 515 by the vertical beam buckles 518.

Sixthly, the sensing optical cable 2105 penetrates through the optical fiber threading top hole 512 in one side, the second first lane changing hole 517 in the first medium bearing beam 516, the third second lane changing hole 522 in the second medium bearing beam 521 and the fourth third lane changing hole 525 in the third medium bearing beam 524 at the left side are used as the distribution channels of the sensing optical cable 2105, the sensing optical cable 2105 led out from the left side is sequentially led to the optical fiber threading top hole 512 at the corresponding side through the fourth third lane changing hole 525, the third second lane changing hole 522 and the second first lane changing hole 517 at the right side are used as the same distribution channels as above, the angle of the main folded plates 505 and a horizontal plane is regulated to be 40 degrees, and then, the main folded plates 505 at the left and right sides are connected by the connecting rods 506, the transverse folded plates 504 are fixed on the main folded plates 505 by the transverse folded plate connecting shafts 503 and are unfolded, the vertical folded plates 500 are clamped into the vertical folded plate square grooves 501 and are fixedly arranged in the main folded plates 500 by the vertical folded plate through shafts 502, the vertical folded plates 500 are unfolded, the obtained energy is stored in the storage batteries 510 after a certain time so as to provide power for the pressure water inlet tanks 508, a value is acquired by monitoring at the set moment, a time history changing curve of the sensing optical cables 2105 is drawn, the numerical value of a resistance thermometer 527 is recorded and is comparatively analyzed, and the position with greater continuous change in the time history curve is analyzed, so that the seepage behavior optical fiber self-adaptive indemnification is realized.

Based on the six steps, seepage-hidden optical fiber location, seepage flow velocity distributed optical fiber monitoring, online seepage line diagnosis and seepage behavior optical fiber self-adaptive identification are respectively realized, and behaviors on various aspects of seepage of the water engineering are comprehensively and systematically reflected.

The above description is merely used as preferred embodiments of the present invention, it should be noted that several improvements and modifications can also be made by the ordinary skilled in the art without departing from the principle of the present invention, and the improvements and modifications should be regarded to fall into the scope of the present invention.

What is claimed is:

1. A water engineering seepage behavior fusing and sensing system, comprising a seepage-hidden optical fiber locating device, a seepage flow velocity distributed optical fiber monitoring device, an online seepage line diagnosis device and a seepage behavior optical fiber self-adaptive identification device, wherein a location of a water engineering seepage point is realized by using the seepage-hidden optical fiber locating device, then, a seepage flow velocity of a water engineering is monitored by virtue of the seepage flow velocity distributed optical fiber monitoring device, an online diagnosis of a seepage line on a section of a whole hydraulic structure is realized by using the online seepage line diagnosis device, and finally, current seepage behavior is integrally monitored and evaluated by using the seepage behavior optical fiber self-adaptive identification device, so that fusing and sensing of the seepage behavior of the water engineering are completed; and the seepage-hidden optical fiber locating device comprises an energy system and a monitoring system, the energy system comprises a mobile device, a T-shaped connecting and guiding platform located above the mobile device and a plurality of bearing platforms located on the T-shaped connecting and guiding platform, the bearing platforms are provided with solar cell panels, the solar cell panels are connected with electric accumulators, and the electric accumulators are connected with a multi-angle interface arranged on the mobile device; the monitoring system comprises a rotary connection controller, a plurality of electronic monitoring platforms and temperature control monitoring platforms, the rotary connection controller is respectively connected with through hard pipes and a through hose located above a to-be-monitored region, each of the through hard pipes and the through hose is provided with a control valve, the through hard pipes are connected with a plurality of water transfer outlets by water pressure valves, the water transfer outlets are connected with a dispersed water transfer hole and a centralized water transfer hole by rotary connection rings, and tail end of the through hose is of a multi-degree-of-freedom port; a plurality of temperature control slotted holes is distributed in the to-be-monitored region, monitoring platform barrels are mounted in the temperature control slotted holes, a plurality of electronic monitoring platforms is sequentially arranged from bottom to top in each of the monitoring platform barrels, and the temperature control monitoring platforms connected with the electronic monitoring platforms are arranged above the temperature control slotted holes in surface of the to-be-monitored region; and crisscross sensing optical cables are distributed in the to-be-monitored region and are connected with an optical fiber demodulator.

2. The water engineering seepage behavior fusing and sensing system of claim 1, wherein the mobile device comprises a battery storage box, runners and swivels, the battery storage box is provided with runner slots, the runners are located in the runner slots and are connected with the battery storage box by swivel connecting rods, the swivel connecting rods are connected with the battery storage box by the swivels, and the multi-angle interface is located on the battery storage box; the T-shaped connecting and guiding platform is internally provided with a multistage lifting column which is mounted on the battery storage box; and two through hard pipes are provided, the through hose is located between the two through hard pipes, and the through hose and the two through hard pipes are shaped like a Chinese character Shan.

3. The water engineering seepage behavior fusing and sensing system of claim 2, wherein three electronic monitoring platforms, including a first electronic monitoring platform, a second electronic monitoring platform and a third electronic monitoring platform, are sequentially arranged from bottom to top on each of the monitoring platform barrels and are respectively connected with a first temperature control monitoring platform, a second temperature control monitoring platform and a third temperature control monitoring platform; outer surface of each of the monitoring platform barrels is provided with a heat conducting layer; three bearing platforms are provided, each of the three bearing platforms is provided with one of the solar cell panels, and included angles of the solar cell panels and a horizontal plane are respectively 45 degrees, 0 degree and 135 degrees; and outsides of the optical cables are sleeved with heating net layers and hard guard rings.

4. A method of the water engineering seepage behavior fusing and sensing system of claim 3, comprising the following steps:
firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

5. A method of the water engineering seepage behavior fusing and sensing system of claim 2, comprising the following steps:
firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

6. The water engineering seepage behavior fusing and sensing system of claim 1, wherein the seepage flow velocity distributed optical fiber monitoring device comprises resistant side columns and side column bodies, seepage receiving clamping slots located at upper ends and outer channel frame bodies located at lower ends are connected between the resistant side columns and the side column bodies, each of the seepage receiving clamping slots is sequentially provided with a plurality of funneled seepage receiving guide slots, lower ends of the seepage receiving guide slots are connected with force transfer monitoring barrels in which flow-assisted force transfer bodies are arranged, lower ends of the flow-assisted force transfer bodies are connected with elastic accommodating sacs, and each of the flow-assisted force transfer bodies is provided with a circle of double-sided elastic bodies; one end of each of the outer channel frame bodies is provided with an initial fiber locking end on which a transition runner is arranged, the resistant side columns are provided with laser excitation sources connected with the sensing optical cables, the outer channel frame bodies are provided with optical fiber channels, the sensing optical cables are connected with light source detectors located on the side column bodies after sequentially passing through the transition runners, the optical fiber channels and tail fiber locking ends located on the side column bodies; and the elastic accommodating sacs are pressed on the sensing optical cables in a downward moving process due to an up-and-down movement of the double-sided elastic bodies.

7. The water engineering seepage behavior fusing and sensing system of claim 6, wherein water converging honeycomb holes are formed in the seepage receiving clamping slots, the initial fiber locking end is provided with a locking device for locking the sensing optical cables, the locking device comprises a horizontal plate and a pair of fixture bodies symmetrically distributed along the horizontal plate, the horizontal plate is located between a left baffle plate and a right baffle plate which are located on a supporting platform, the fixture bodies are connected with a moving plate by vertical guide rods, a horizontal groove is formed in the horizontal plate, the vertical guide rods move along the horizontal groove, the moving plate is connected with a vertical riveting rod passing through the horizontal groove, two ends of the vertical riveting rod are provided with nuts, and the moving plate moves to drive the fixture bodies to move, so that the sensing optical cables are clamped by the fixture bodies; each of the fixture bodies comprises a guide cross rod, an axial pulling and pressing column and a handheld resistant body, one end of the guide cross rod is connected with the vertical guide rod, the other end of the guide cross rod is connected with the axial pulling and pressing column sleeving a transverse main shaft, the transverse main shaft is fixedly arranged on the left baffle plate or the right baffle plate, and a transverse pulling and pressing column is connected with the handheld resistant body which is arc-shaped; and top ends of the resistant side columns are triangular sharp slopes, and a plurality of inclined water diversion reverse holes and water guide and bottom drainage holes are formed in side surfaces of the seepage receiving guide slots.

8. A method of the water engineering seepage behavior fusing and sensing system of claim 7, comprising the following steps:
firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

9. A method of the water engineering seepage behavior fusing and sensing system of claim 6, comprising the following steps:
firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

10. The water engineering seepage behavior fusing and sensing system of claim 1, wherein the online seepage line diagnosis device comprises an input end guiding and connecting device, an inner frame body device, an output end guiding and connecting device and an outer matching body device, the input end guiding and connecting device is connected with the inner frame body device by a first port platform, and the inner frame body device is connected with the output end guiding and connecting device by a second port platform and is connected with the outer matching body device by a transverse guide rod;
the input end guiding and connecting device comprises a gas pressure locking and connecting module and a fiber bearing and communicating module, the gas pressure locking and connecting module comprises a middle arc-shaped pressure head and a gas guide column, the middle arc-shaped pressure head and the gas guide column are sealed by a pressure head transition end to form a concave gas accommodating tank, external gases enter through a gas guide hole outside the gas guide column, tail end of the gas guide column is of a conical gas passage communicating with a gas storage tank, the gas storage tank is internally provided with a first fiber guide crossing passing through a gas storage passage, an input end of a sensing optical fiber passes through the first fiber guide crossing, the conical gas passage is pushed open by the external gases, the external gases are introduced into the gas storage tank, the gas storage tank presses against the first fiber guide crossing by virtue of gases filled in the gas storage tank, and a pressing degree is regulated by using a handle and an exhaust passage; and the fiber bearing and communicating module comprises an outer hard protecting layer in which an inner soft connecting layer is connected, the inner soft connecting layer inwards clings to a second fiber guide crossing, and the input end of the sensing optical fiber enters an inner frame body after passing through the second fiber guide crossing;
the inner frame body device comprises a vertical bearing platform, a middle connecting column, fiber bearing shafts, an excircle bearing wall and sensing optical fibers, the vertical bearing platform and the middle connecting column are provided with a plurality of the fiber bearing shafts, the sensing optical fibers are distributed in an S shape by the fiber bearing shafts distributed on the vertical bearing platform and the middle connecting column, each of the fiber bearing shafts is a double-spiral channel and distributed with two of the sensing optical fibers in parallel, and the middle connecting column is located in the excircle bearing wall;

the output end guiding and connecting device comprises a groove pressure locking module and a fiber bearing and fixing module, the groove pressure locking module comprises a rotating handle and a rotating rod, the rotating handle is connected with the rotating rod, the rotating handle rotates to drive the rotating rod to rotate, the rotating rod is connected with a connecting cone after passing through a spherical shaft and is in threaded connection with the connecting cone, the spherical shaft is connected with frame fixing rods fixedly arranged on the second port platform which is fixedly arranged on the vertical bearing platform, and the connecting cone is connected with a T-shaped cross rail and moves up and down to drive the T-shaped cross rail to run up and down; and the fiber bearing and fixing module comprises a fiber guide groove parallel to the T-shaped cross rail, and the sensing optical fibers are transitioned into the fiber guide groove by traction of the fiber bearing shafts; and the outer matching body device comprises an outer frame body module and an electromechanical assembly module, the outer frame body module comprises a guide rod screw head, a guide rod bolt and a transverse guide rod, the guide rod screw head and the guide rod bolt are mounted on the transverse guide rod which is located on the vertical bearing platform, the guide rod screw head and the guide rod bolt are used for fixing an unfolded beam on the transverse guide rod, a lower bottom surface of the transverse guide rod is equipped with a fiber bearing box in which a fiber bearing plate capable of bearing input ends and output ends of the sensing optical fibers is placed, and a channel allowing cables to pass through is formed in the transverse guide rod; and the electromechanical assembly module comprises a motor box, the cables are connected with the motor box, and the motor box drives a rotary rolling shaft to rotate at high speed, and furthermore, a semicircular turnplate connected with the rotary rolling shaft is driven to rotate.

11. The water engineering seepage behavior fusing and sensing system of claim 10, wherein a plurality of round holes is distributed in outer side of the vertical bearing platform, the input end guiding and connecting device and the output end guiding and connecting device are fixedly arranged in the round holes by port ear handles, the vertical bearing platform is parallel to the middle connecting column and is tangent to the excircle bearing wall, and the same input end guiding and connecting device, inner frame body device, output end guiding and connecting device and outer matching body device are distributed by taking the middle connecting column as a symmetry axis.

12. A method of the water engineering seepage behavior fusing and sensing system of claim 11, comprising the following steps:

firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;

secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

13. A method of the water engineering seepage behavior fusing and sensing system of claim 10, comprising the following steps:

firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;

secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

14. The water engineering seepage behavior fusing and sensing system of claim 1, wherein the seepage behavior optical fiber self-adaptive identification device comprises two main folded plates which are symmetrically distributed and frame-shaped vertical pressure bearing beams which are symmetrically distributed, one end of each of the two main folded plates is hinged with a storage battery, the other end of each of the two main folded plates is hinged with a connecting rod, two sides of the main folded plates are provided with transverse folded plates, vertical folded plates connected with the main folded plates are mounted above the main folded plates, and the storage batteries are connected with pressure water inlet tanks by using guide wires; and each of the vertical pressure bearing beams is sequentially provided with a first medium bearing beam, a second medium bearing beam and a third medium bearing beam from top to bottom, at least two lane changing holes are formed in each of the first medium bearing beam, the second medium bearing beam and the third medium bearing beam, a space defined by the vertical pressure bearing beam, the first medium bearing beam, the second medium bearing beam and the third medium bearing beam is filled with earth-rock particles, top of each of the vertical pressure bearing beams is provided with an upper hole bearing beam, optical fiber threading top holes are formed in two ends of the upper hole bearing beam, shunting tanks are formed in the upper hole bearing beams, single shunting holes penetrating through the upper hole bearing beams are formed in the shunting tanks, and the shunting tanks are communicated with the pressure water inlet tanks.

15. The water engineering seepage behavior fusing and sensing system of claim 14, wherein the main folded plates are of telescopic structures, each of the vertical pressure bearing beams is provided with a plurality of guiding and communicating pipes which are connected with resistance thermometers located in the vertical pressure bearing beams, the vertical folded plates are vertical to the main folded plates and the transverse folded plates, the transverse folded plates are fixedly arranged on the main folded plates in parallel by transverse folded plate connecting shafts, the single shunting holes are symmetrically distributed along a symcenter of the main folded plates, and the number of the single shunting holes formed in one side is an odd number.

16. A method of the water engineering seepage behavior fusing and sensing system of claim 15, comprising the following steps:
    firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
    secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
    thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

17. A method of the water engineering seepage behavior fusing and sensing system of claim 14, comprising the following steps:
    firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
    secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
    thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

18. A method of the water engineering seepage behavior fusing and sensing system of claims 1 , comprising the following steps:
    firstly, assembling the seepage-hidden optical fiber locating device, the seepage flow velocity distributed optical fiber monitoring device, the online seepage line diagnosis device and the seepage behavior optical fiber self-adaptive identification device, determining a to-be-buried number of the four devices, connecting the four devices by using the sensing optical cables, and then, carrying out burying and mounting;
    secondly, starting the seepage-hidden optical fiber locating device, the seepage flow velocity distributed optical fiber monitoring device, the online seepage line diagnosis device and the seepage behavior optical fiber self-adaptive identification device to carry out testing, and calibrating an initial reading of each of the devices; and
    thirdly, integrally monitoring and evaluating the current seepage behavior by acquiring and analyzing information of the sensing optical cables on the seepage-hidden optical fiber locating device, the seepage flow velocity distributed optical fiber monitoring device, the online seepage line diagnosis device and the seepage behavior optical fiber self-adaptive identification device to complete the fusing and sensing of the seepage behavior of the water engineering.

\* \* \* \* \*